United States Patent
Iwazaki et al.

(10) Patent No.: US 10,958,194 B2
(45) Date of Patent: Mar. 23, 2021

(54) PIEZOELECTRIC DRIVE DEVICE, PIEZOELECTRIC MOTOR, ROBOT, ELECTRONIC COMPONENT TRANSPORT APPARATUS, AND PRINTER

(71) Applicant: Seiko Epson Corporation, Tokyo (JP)

(72) Inventors: Tomohisa Iwazaki, Okaya (JP); Yutaka Arakawa, Hara-mura (JP)

(73) Assignee: Seiko Epson Corporation

(*) Notice: Subject to any disclaimer, the term of this patent is extended or adjusted under 35 U.S.C. 154(b) by 526 days.

(21) Appl. No.: 15/938,397

(22) Filed: Mar. 28, 2018

(65) Prior Publication Data

US 2018/0287514 A1 Oct. 4, 2018

(30) Foreign Application Priority Data

Mar. 31, 2017 (JP) .............................. JP2017-069768

(51) Int. Cl.
| | | |
|---|---|---|
| *H02N 2/14* | (2006.01) | |
| *B41J 2/045* | (2006.01) | |
| *B25J 9/12* | (2006.01) | |
| *H02N 2/00* | (2006.01) | |
| *H02N 2/10* | (2006.01) | |
| *H02N 2/02* | (2006.01) | |

(52) U.S. Cl.
CPC .............. *H02N 2/14* (2013.01); *B25J 9/123* (2013.01); *B25J 9/126* (2013.01); *B41J 2/04541* (2013.01); *B41J 2/04581* (2013.01); *H02N 2/0015* (2013.01); *H02N 2/0055* (2013.01); *H02N 2/026* (2013.01); *H02N 2/103* (2013.01); *Y10S 901/23* (2013.01)

(58) Field of Classification Search
CPC ........ H02N 2/14; H02N 2/0055; H02N 2/026; B41J 2/04581; Y10S 901/23
See application file for complete search history.

(56) References Cited

U.S. PATENT DOCUMENTS

| | | | |
|---|---|---|---|
| 2011/0317292 A1* | 12/2011 | Kuwano | H02N 2/001 359/824 |
| 2012/0316674 A1* | 12/2012 | Urano | H02N 2/003 700/245 |
| 2013/0255427 A1* | 10/2013 | Mizushima | B25J 18/00 74/490.03 |
| 2014/0059724 A1* | 2/2014 | Iyoki | G01Q 30/18 850/1 |
| 2017/0054387 A1* | 2/2017 | Sumioka | H02N 2/008 |

FOREIGN PATENT DOCUMENTS

| | | |
|---|---|---|
| JP | 2010-063230 A | 3/2010 |
| JP | 2016-096187 A | 5/2016 |

* cited by examiner

*Primary Examiner* — Bryan P Gordon
(74) *Attorney, Agent, or Firm* — Harness, Dickey & Pierce, P.L.C.

(57) ABSTRACT

A piezoelectric drive device includes a piezoelectric actuator which includes a vibration portion that vibrates and a protruding portion that protrudes from the vibration portion, a driven member, an optical scale, a sensor which receives transmitted light or reflected light from the optical scale and outputs a signal in accordance with intensity of the received light, in which a facing area of the optical scale and the sensor is disposed to be deviated to one side in a direction in which the optical scale and the sensor are aligned with respect to a contact portion between the protruding portion and the driven member.

20 Claims, 13 Drawing Sheets

PIEZOELECTRIC DRIVE DEVICE, PIEZOELECTRIC MOTOR, ROBOT, ELECTRONIC COMPONENT TRANSPORT APPARATUS, AND PRINTER

BACKGROUND

1. Technical Field

The present invention relates to a piezoelectric drive device, a piezoelectric motor, a robot, an electronic component transport apparatus, and a printer.

2. Related Art

A piezoelectric actuator that vibrates a vibrator by a piezoelectric element to drive a driven member is known (for example, refer to JP-A-2016-096187). For example, an apparatus described in JP-A-2016-096187 includes a rotatable rotary stage, a piezoactuator for generating a drive force that rotates the rotary stage, and an angle detection unit for detecting a rotation angle of the rotary stage, and the angle detection unit has an encoder disc and an encoder sensor.

Generally, in a piezoelectric actuator used in the apparatus described in JP-A-2016-096187, abrasion powder may be generated due to abrasion of a portion which is in contact with the driven member accompanied by driving. In the apparatus described in JP-A-2016-096187, there is a problem that abrasion powder as described above adheres to the encoder disc or the encoder sensor and detection failure occurs.

SUMMARY

An advantage of some aspects of the invention is to provide a piezoelectric drive device capable of stably detecting a drive state, and to provide a piezoelectric motor, a robot, an electronic component transport apparatus, and a printer that are equipped with the piezoelectric drive device.

The advantage described above can be achieved by the following configurations.

A piezoelectric drive device according to an aspect of the invention includes a first member, a second member disposed above the first member in a vertical direction, a piezoelectric actuator which is disposed on one of the first member and the second member and includes a vibration portion that vibrates and a protruding portion that protrudes from the vibration portion, a driven member which is disposed on the other of the first member and the second member and of which a position or posture changes relatively to the piezoelectric actuator due to contact with the protruding portion accompanied by vibration of the vibration portion, and an optical scale which is disposed on one of the first member and the second member and of which a position or posture changes relatively to the piezoelectric actuator or the driven member, accompanied by the relative change of the position or posture of the driven member with respect to the piezoelectric actuator, and a sensor which is disposed on the other of the first member and the second member, receives transmitted light or reflected light from the optical scale, and outputs a signal in accordance with intensity of the received light, in which a scale surface of the optical scale and a sensor surface of the sensor is positioned on an upper side in the vertical direction above a contact portion between the protruding portion and the driven member.

According to such a piezoelectric drive device, at least one of the scale surface of the optical scale and the sensor surface of the sensor is positioned on the upper side in the vertical direction than the contact portion between protruding portion and the driven member and thus, it is possible to reduce that abrasion powder which is generated at the contact portion between the protruding portion and the driven member accompanied by frictional sliding between the protruding portion and the driven member reaches at least one of the scale surface of the optical scale and the sensor surface of the sensor. As a result, it is possible to stably detect the drive state by the sensor.

A piezoelectric drive device according to another aspect of the invention includes a piezoelectric actuator which includes a vibration portion that vibrates and a protruding portion that protrudes from the vibration portion, a driven member of which a position or posture changes relatively to the piezoelectric actuator due to contact with the protruding portion accompanied by vibration of the vibration portion, an optical scale of which a position or posture changes relatively to the piezoelectric actuator or the driven member, accompanied by the relative change of the position or posture of the driven member with respect to the piezoelectric actuator, and a sensor which receives transmitted light or reflected light from the optical scale and outputs a signal in accordance with intensity of the received light, in which a facing area of the optical scale and the sensor is disposed to be deviated to one side in a direction in which the optical scale and the sensor are aligned with respect to a contact portion between the protruding portion and the driven member.

According to such a piezoelectric drive device, the facing area of the optical scale and the sensor is disposed to be deviated to one side in a direction in which the optical scale and the sensor are aligned with respect to the contact portion between the protruding portion and the driven member and thus, it is possible to install the piezoelectric drive device so that both the scale surface of the optical scale and the sensor surface of the sensor are positioned on an upper side in the vertical direction than the contact portion between the protruding portion and the driven member. For that reason, it is possible to reduce that the abrasion powder generated at the contact portion accompanied by frictional sliding between the protruding portion and the driven member reaches the scale surface of the optical scale and the sensor surface of the sensor. For that reason, it is possible to stably detect the drive state by the sensor.

In the piezoelectric drive device according to the aspect of the invention, it is preferable that a surface of the driven member with which the protruding portion contacts and the scale surface of the optical scale face the same side.

With this configuration, it is possible to simplify wiring to the piezoelectric actuator and the sensor.

In the piezoelectric drive device according to the aspect of the invention, it is preferable to include a first member on which the driven member and the optical scale are installed, and a second member which supports the piezoelectric actuator and the sensor and is provided so as to be changeable in a position or posture relatively to the first member.

With this configuration, it is possible to dispose the driven member and the optical scale such that a surface on the protruding portion side of the driven member and the scale surface of the optical scale face the same side with a relatively simple configuration.

In the piezoelectric drive device according to the aspect of the invention, it is preferable that the first member includes a first installation surface on which the driven member is installed and a second installation surface on which the optical scale is installed and having a height different from that of the first installation surface.

With this configuration, it possible to deviate the surface on the protruding portion side of the driven member and the scale surface of the optical scale in the height direction with a relatively simple configuration regardless of thicknesses of the driven member and the optical scale.

In the piezoelectric drive device according to the aspect of the invention, it is preferable that the first member includes a first surface intersecting the first installation surface and the second installation surface, at a boundary between the first installation surface and the second installation surface.

With this configuration, it is possible to enhance the effects of preventing the generated abrasion powder from scattering toward the optical scale.

In the piezoelectric drive device according to the aspect of the invention, it is preferable that the first member has a recessed portion in which the first installation surface constitutes a bottom surface.

With this configuration, it is possible to easily form the first installation surface and the second installation surface having different heights.

A piezoelectric motor according to another aspect of the invention includes the piezoelectric drive device according to the aspect of the invention.

According to such a piezoelectric motor, it is possible for the piezoelectric drive device to stably detect the drive state and perform highly accurate driving. For that reason, it is possible to improve drive characteristics of the piezoelectric motor.

A robot according to another aspect of the invention includes the piezoelectric drive device according to the aspect of the invention.

According to such a robot, it is possible for the piezoelectric drive device to stably detect the drive state and perform highly accurate driving. For that reason, it is possible to improve characteristics of the robot using such drive characteristics of the piezoelectric drive device.

An electronic component transport apparatus according to another aspect of the invention includes the piezoelectric drive device according to the aspect of the invention.

According to such an electronic component transport apparatus, it is possible for the piezoelectric drive device to stably detect the drive state and perform highly accurate driving. For that reason, it is possible to improve characteristics of the electronic component transport apparatus using such drive characteristics of the piezoelectric drive device.

A printer according to another aspect of the invention includes the piezoelectric drive device according to the aspect of the invention.

According to such a printer, it is possible for the piezoelectric drive device to stably detect the drive state and perform highly accurate driving. For that reason, it is possible to improve characteristics of the printer using such drive characteristics of the piezoelectric drive device.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, a piezoelectric drive device, a piezoelectric motor, a robot, an electronic component transport apparatus, and a printer according to the invention will be described in detail based on embodiments illustrated in the accompanying drawings.

1. Piezoelectric Drive Device

Figure 1:
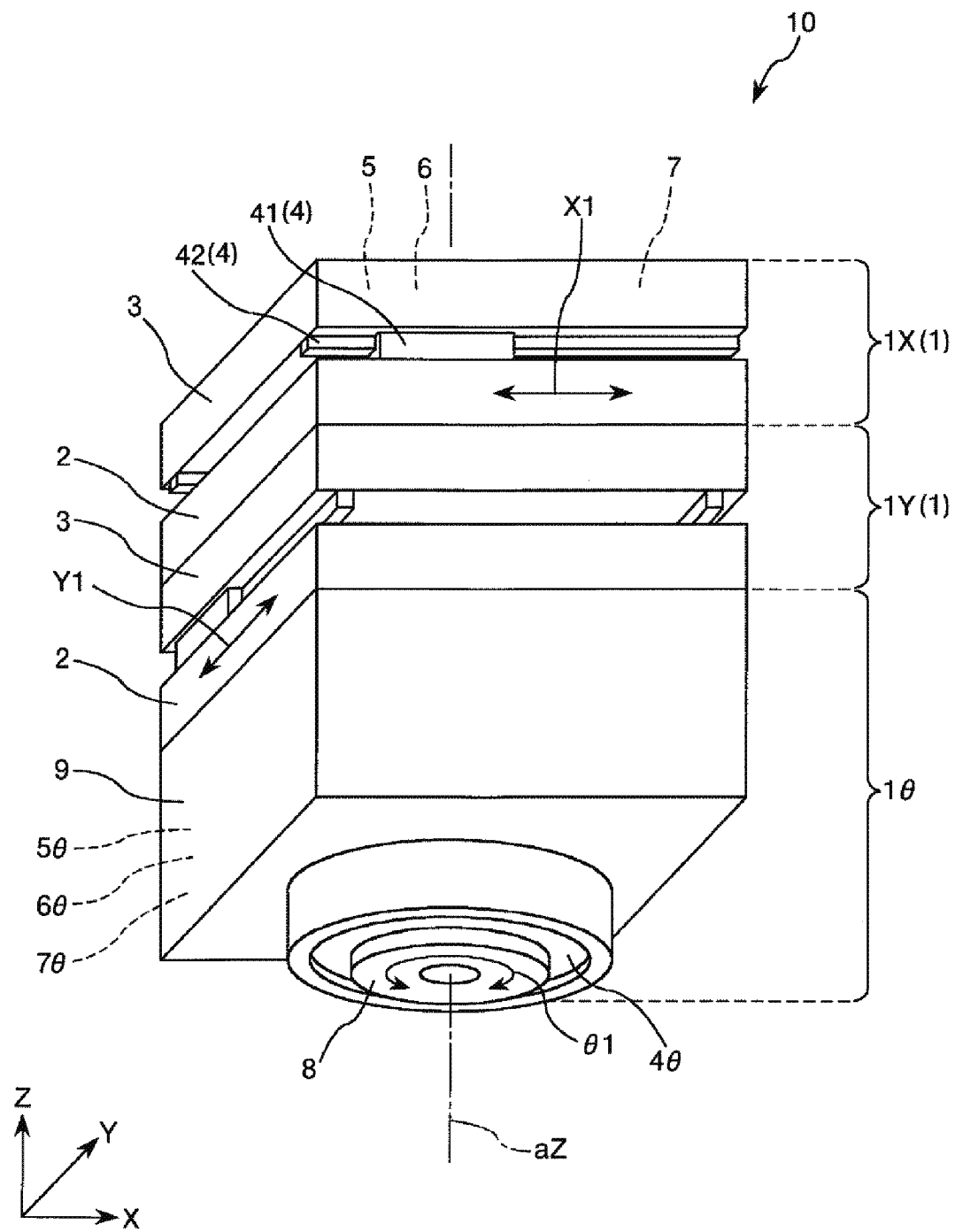
FIG. 1 is a perspective view illustrating a schematic configuration of a piezoelectric drive device (piezoelectric drive unit) according to a first embodiment of the invention.

FIG. 1 is a perspective view illustrating a schematic configuration of a piezoelectric drive device (piezoelectric drive unit) according to a first embodiment of the invention. In the following, for convenience of explanation, description will be made by appropriately using the X-axis, the Y-axis, and the Z-axis as three axes orthogonal to each other. In each figure, it is assumed that a tip side of the arrow indicating these axes is "+" and a base side is "−". A direction parallel to the X-axis is referred to as an "X-axis direction", a direction parallel to the Y-axis as a "Y-axis direction", and a direction parallel to the Z-axis as a "Z-axis direction". Also, a plane parallel to both the X-axis and the Y-axis (plane in which the normal line is the Z-axis direction) is referred to as an "XY plane" and a plane parallel to both the X-axis and the Z-axis (plane in which the normal line is the Y-axis direction) is referred to as an "XZ plane". A plane parallel to both the Y-axis and the Z-axis (a plane where the normal line is the X-axis direction) is referred to as a "YZ plane".

The piezoelectric drive device 10 illustrated in FIG. 1 is a piezoelectric drive unit that performs driving in the X-axis direction (direction indicated by the arrow X1 in the figure), driving in the Y-axis direction (direction indicated by the arrow Y1 in the figure), and driving around the Z-axis (direction indicated by the arrow θ1 in the figure). The piezoelectric drive device 10 includes a piezoelectric drive device 1X (first piezoelectric drive device) that performs driving in the X-axis direction, a piezoelectric drive device 1Y (second piezoelectric drive device) that performs driving in the Y-axis direction, a piezoelectric drive device 1θ (third piezoelectric drive device) that performs driving around the Z-axis, and the devices are connected side by side along the Z-axis direction. In the following, these piezoelectric drive devices will be sequentially described.

First Piezoelectric Drive Device

Figure 2:
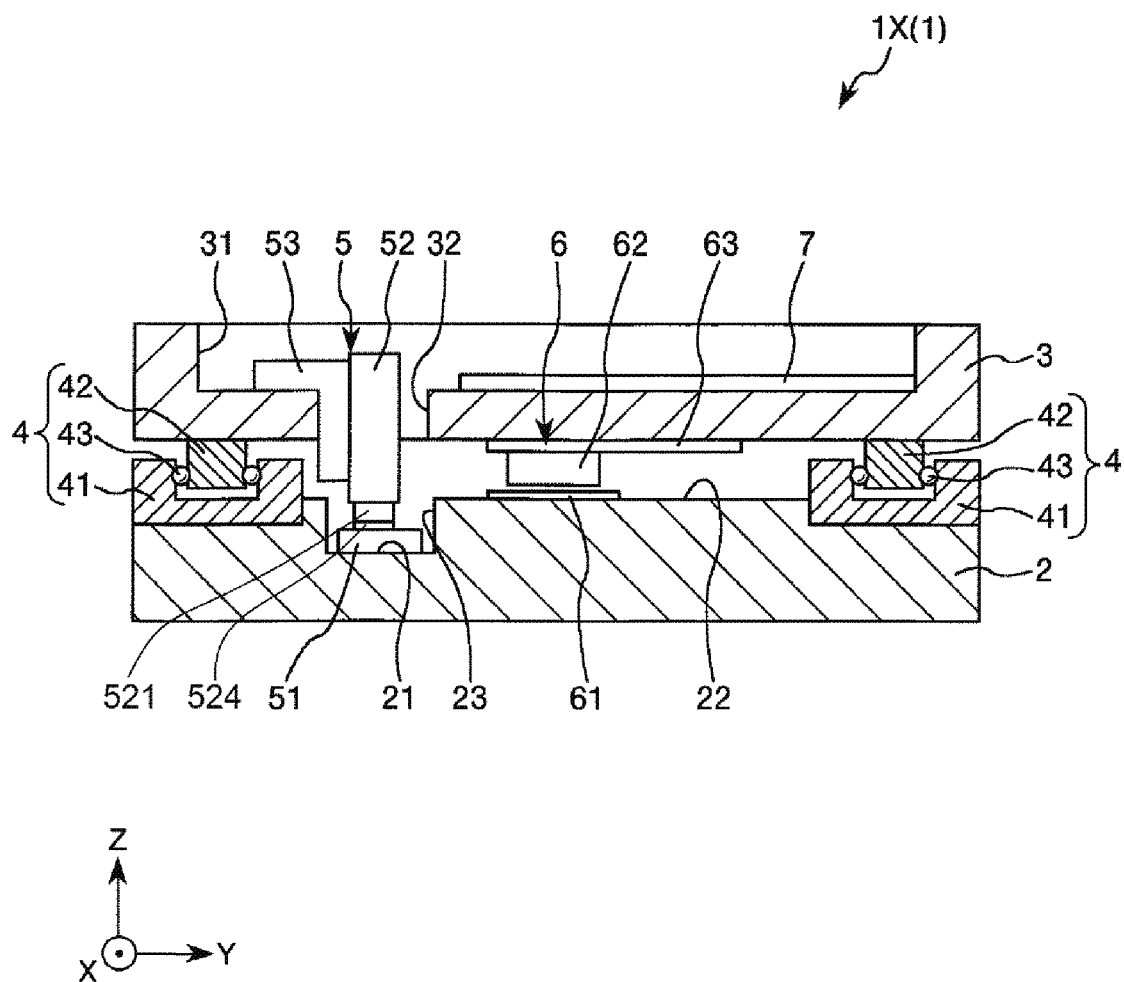
FIG. 2 is a cross-sectional view of a piezoelectric drive device for an X1 direction included in the piezoelectric drive device illustrated in FIG. 1.
Figure 3:
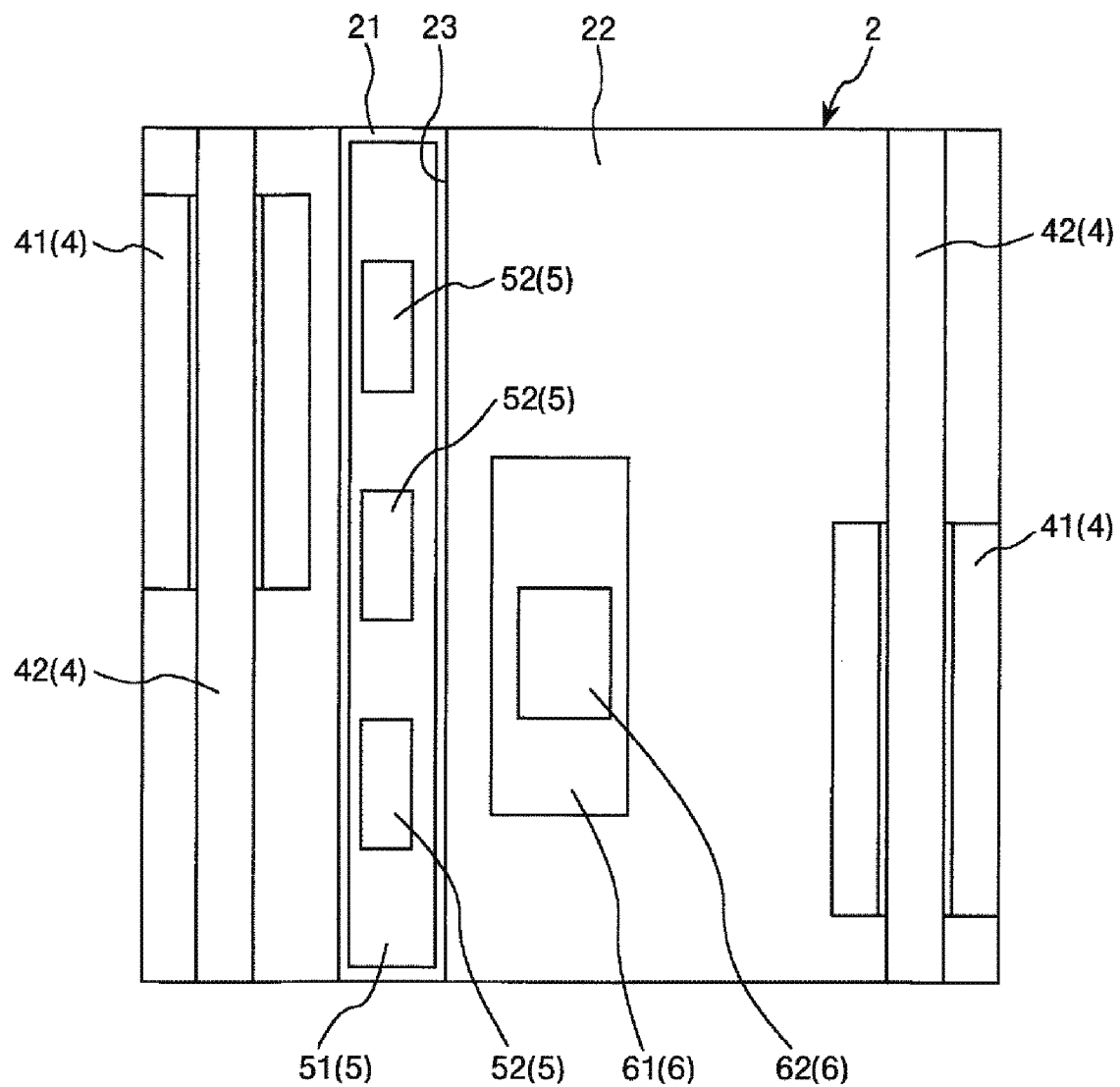
FIG. 3 is a diagram of the piezoelectric drive device illustrated in FIG. 2 when viewed from a Z-axis direction.
Figure 4:
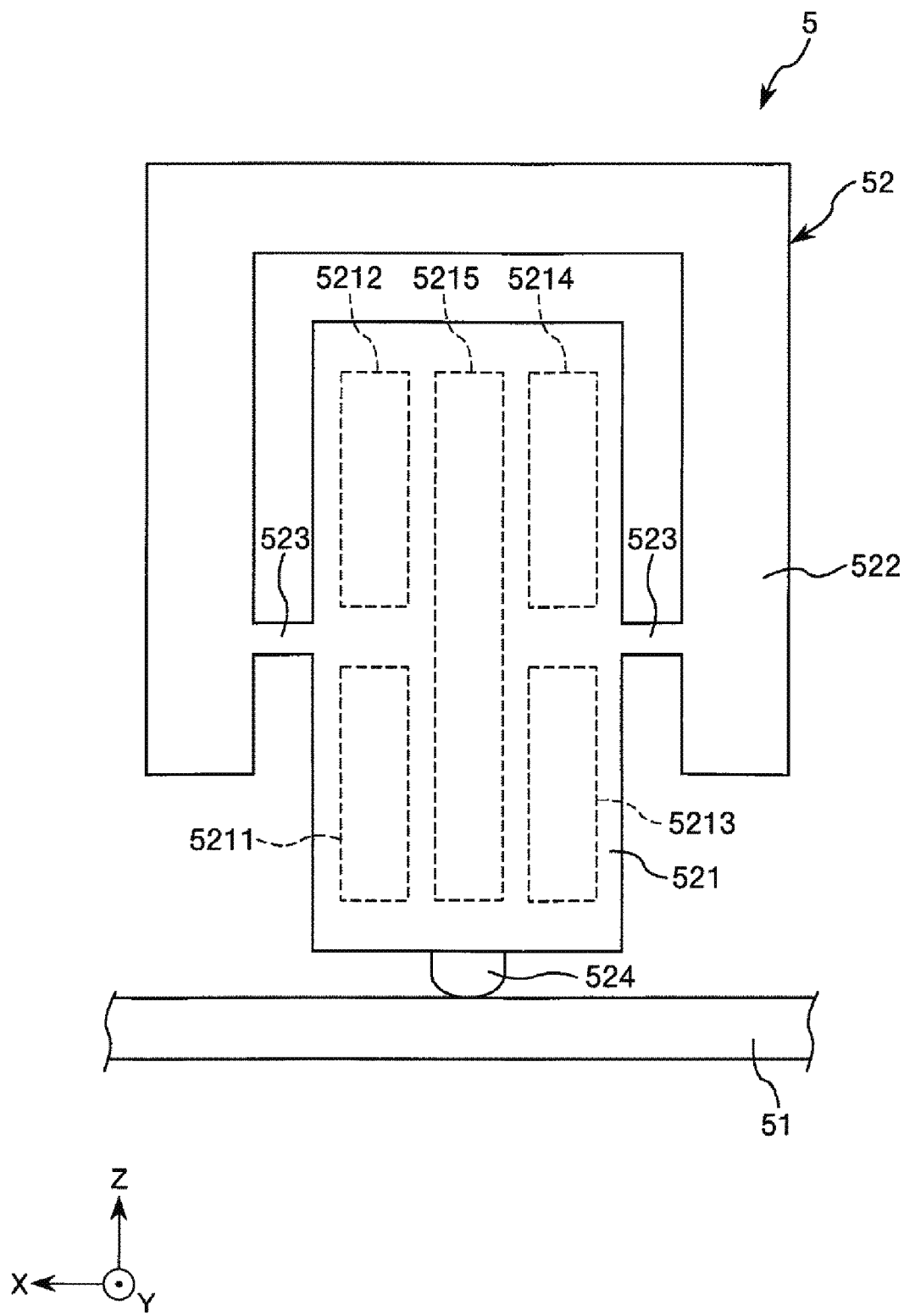
FIG. 4 is a plan view of a piezoelectric actuator included in the piezoelectric drive device illustrated in FIG. 2.
Figure 5:
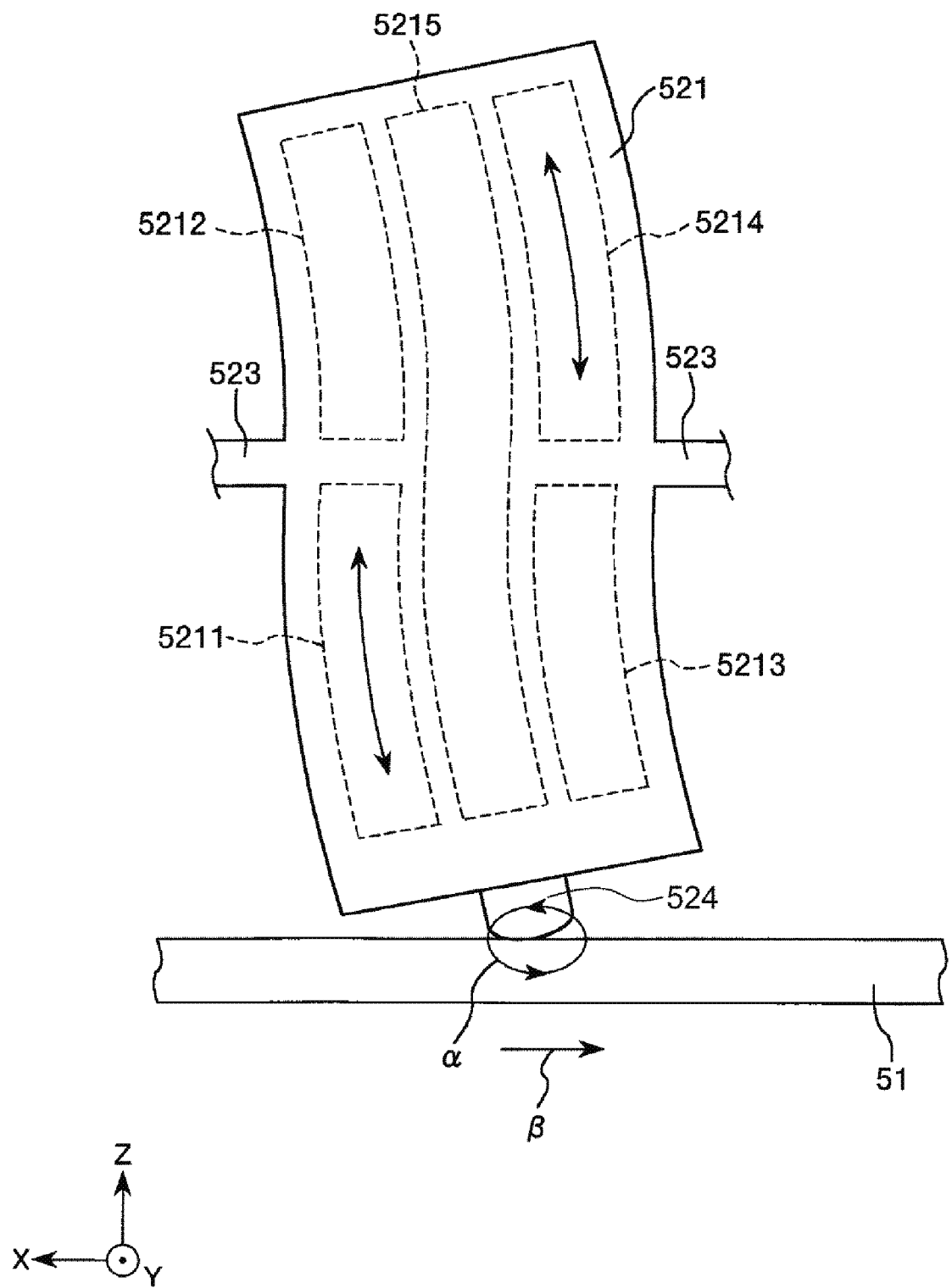
FIG. 5 is a diagram for explaining an operation of the piezoelectric actuator illustrated in FIG. 4.
Figure 6:
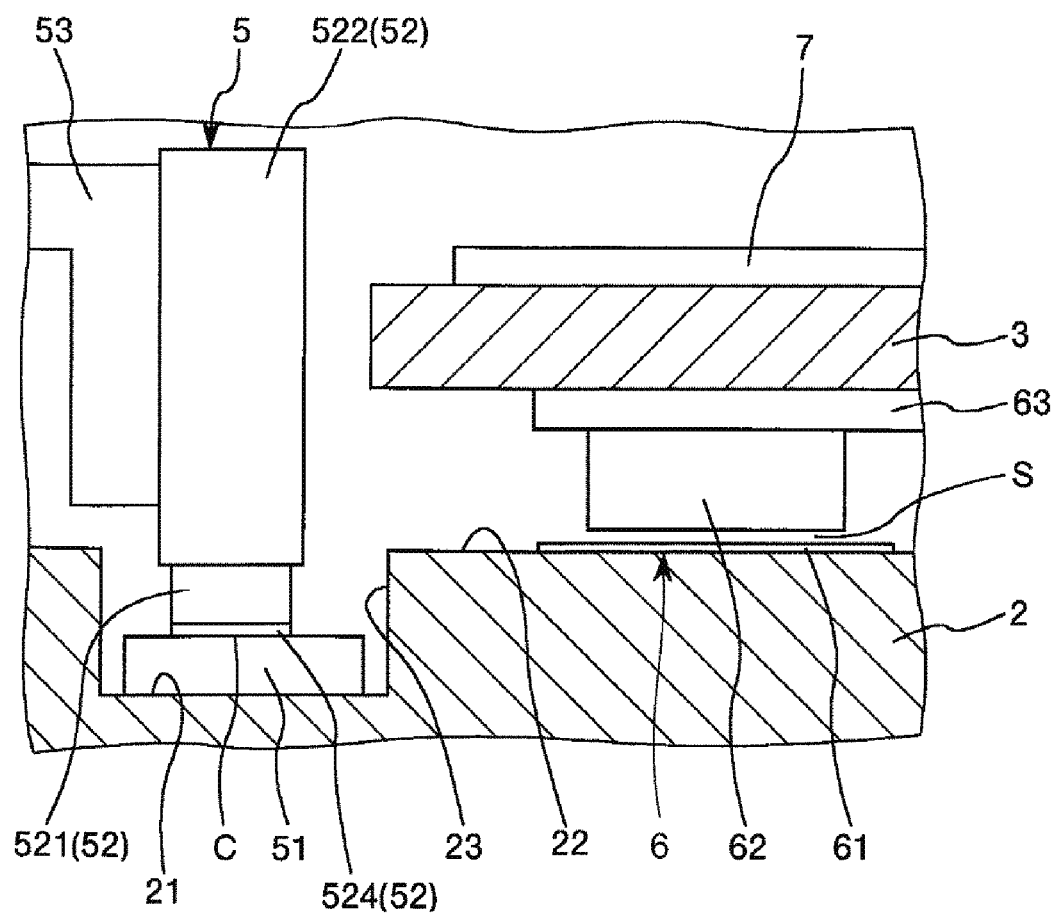
FIG. 6 is a partially enlarged cross-sectional view of the piezoelectric drive device illustrated in FIG. 2.

FIG. 2 is a cross-sectional view of a piezoelectric drive device for the X1 direction included in the piezoelectric drive device illustrated in FIG. 1. FIG. 3 is a diagram of the piezoelectric drive device illustrated in FIG. 2 when viewed from the Z-axis direction. FIG. 4 is a plan view of a piezoelectric actuator included in the piezoelectric drive device illustrated in FIG. 2. FIG. 5 is a diagram for explaining an operation of the piezoelectric actuator illustrated in FIG. 4. FIG. 6 is a partially enlarged cross-sectional view of the piezoelectric drive device illustrated in FIG. 2. In FIG. 3, for convenience of explanation, illustration of a portion of a drive portion 5 and a detection portion 6, and a second member 3 are omitted.

As illustrated in FIG. 2, the piezoelectric drive device 1X includes a first member 2, the second member 3, a guide mechanism 4 for guiding the second member 3 so as to be relatively moved in the X-axis direction (direction indicated by the arrow X1 in FIG. 1) with respect to the first member 2, a drive portion 5 for relatively moving the second member 3 in the X-axis direction with respect to the first member 2, a detection portion 6 (encoder) for detecting a relative movement in the X-axis direction of the second member 3 with respect to the first member 2, and a circuit portion 7 for operating the drive portion 5 and the detection portion 6.

Each of the first member 2 and the second member 3 is made of, for example, a metal material, a ceramic material or the like, and has a substantially plate shape as a whole along the XY plane. The outer shapes of the first member 2 and the second member 3 in plan view are rectangular (quadrangular) in the figure, but are not limited thereto, and may be another polygon such as a pentagon, a circular shape, an elliptical shape, or the like.

Here, as illustrated in FIG. 2, a recessed portion 23 is formed on one surface (upper side in FIG. 2) of the first member 2. The bottom surface of the recessed portion 23 configures an installation surface 21 on which a driven member 51 of a drive portion 5 to be described below is installed. On one surface (upper side in FIG. 2) of the first member 2, an installation surface 22 on which an optical scale 61 of a detection portion 6 to be described later is installed is provided outside the recessed portion 23.

As such, the recessed portion 23 is formed on one surface (upper side in FIG. 2) of the first member 2 such that the installation surfaces 21 and 22 having different heights along the XY plane are formed. As illustrated in FIG. 3, the recessed portion 23 extends along the X-axis direction and accordingly, the installation surface 21 also extends along the X-axis direction accompanied by extension of the recessed portion 23.

As illustrated in FIG. 2, on one surface (upper side in FIG. 2) of the second member 3, a recessed portion 31 which is open to a side opposite to the first member 2 is formed. In the second member 3, a hole 32 that opens to the bottom surface of a recessed portion 31 and penetrates through the second member 3 in the thickness direction (Z-axis direction) is formed.

The guide mechanism 4 is a linear motion bearing and is disposed between the first member 2 and the second member 3 as illustrated in FIG. 2. The guide mechanism 4 includes a pair of sliders 41, a pair of rails 42 provided corresponding to the pair of sliders 41, and a plurality of balls 43 provided between the slider 41 and the rail 42.

The pair of rails 42 is disposed so as to extend along the X-axis direction and is fixed to the second member 3 by using screws or the like. Each of the pair of sliders 41 is movable along the corresponding rail 42 and is fixed to the first member 2 using, for example, a screw or the like. The slider 41, the rail 42, and the ball 43 are configured to regulate (restrict) a relative movement of the first member 2 and the second member 3 in directions other than the X-axis direction. The slider 41, the rail 42, and the ball 43 may be configured to regulate (restrict) the relative movement of the first member 2 and the second member 3 in the X-axis direction within a predetermined range. Instead of the balls 43, rollers rolling between the slider 41 and the rail 42 may be used.

The drive portion 5 includes the driven member 51 installed in the first member 2, a plurality of (three in the figure) piezoelectric actuators 52 for transmitting a drive force to the driven member 51, and a plurality of (three in the figure) support members 53 supporting the plurality of piezoelectric actuators 52 to the second member 3.

The driven member 51 is installed on the installation surface 21 of the first member 2 described above and is fixed to the first member 2 using, for example, an adhesive or the like. The driven member 51 has a plate shape or a sheet shape and is made of a material having relatively high abrasion resistance such as a ceramic material. As illustrated in FIG. 3, the driven member 51 extends along the X-axis direction.

The plurality of piezoelectric actuators 52 are disposed to be aligned along the X-axis direction. As illustrated in FIG. 4, each of the piezoelectric actuators 52 has a vibration portion 521, a support portion 522, a pair of connection portions 523 connecting the vibration portion 521 and the support portion 522, and a protruding portion 524 protruding from the vibration portion 521.

The vibration portion 521 has a plate shape along the XZ plane. The vibration portion 521 has an elongated shape extending along the Z-axis direction. The vibration portion 521 includes a piezoelectric element 5215 disposed along the longitudinal direction of the vibration portion 521 at the central portion in the width direction (X-axis direction) of the vibration portion 521, two piezoelectric elements 5211 and 5212 disposed along the longitudinal direction of the vibration portion 521 on one side in the width direction of the vibration portion 521 with respect to the piezoelectric element 5215, and two piezoelectric elements 5213 and 5214 disposed along the longitudinal direction of the vibration portion 521 on the other side in the width direction of the vibration portion 521 with respect to the piezoelectric element 5215.

Although not illustrated, such a vibration portion 521 includes, for example, two substrates such as a silicon substrate and a piezoelectric body such as lead zirconate titanate (PZT) disposed between the substrates and a plurality of electrodes (more specifically, a plurality of individual electrodes provided on one surface correspondingly to the piezoelectric elements 5211 to 5214 and one common electrode commonly provided on the other surface of the piezoelectric elements 5211 to 5214) appropriately provided on the front and back sides of the piezoelectric body. Here, each of the support portion 522 and the pair of connection portions 523 has, for example, two substrates integrally formed with the two substrates included in the vibration portion 521 described above. In the support portion 522, for example, an insulating spacer having the same thickness as that of the piezoelectric body included in the vibration portion 521 described above is interposed between the two substrates.

A protruding portion 524 is formed at the center portion to protrude from the center portion in the width direction of the vibration portion 521 on the end portion (tip end portion) of one side (lower side in FIG. 4) in the longitudinal direction (Z-axis direction) of the vibration portion 521 so as to protrude from the vibration portion 521. The protruding portion 524 is made of, for example, a material having excellent abrasion resistance such as ceramics, and is joined to the vibration portion 521 with an adhesive or the like. The protruding portion 524 has a function of transmitting vibration of the vibration portion 521 to the driven member 51 by frictional sliding. The shape of the protruding portion 524 is not limited to the illustrated shape as long as the protruding portion 524 can transmit the drive force of the vibration portion 521 to the driven member 51.

The support member 53 is made of, for example, a metal material, a ceramic material, or the like, and is fixed to the second member 3 using, for example, a screw or the like. Also, an elastic member (not illustrated) such as a leaf spring made of silicon is attached to the support portion 522 by an adhesive or the like, and the elastic member is fixed to the support member 53 by using, for example, a screw or the like. Here, the support portion 522 is fixed to the second member 3 through the support member 53 and the elastic member so that the protruding portion 524 contacts (presses) the driven member with a predetermined pressure accompanied by elastic deformation of the elastic member.

The piezoelectric actuator 52 included in the drive portion 5 as described above operates by appropriately inputting drive signals of a predetermined frequency from a circuit portion 7 to the piezoelectric elements 5211 to 5215. For example, a phase difference between the drive signal to the piezoelectric elements 5211 and 5214 and the drive signal to the piezoelectric elements 5212 and 5213 is set to 180° and a phase difference between the drive signal to the piezoelectric elements 5211 and 5214 and the drive signal to the piezoelectric element 5215 is set to be −90° to +90° so that as illustrated in FIG. 5, the vibration portion 521 bendingly vibrates in an S shape due to expansion and contraction of the piezoelectric elements 5211 to 5215 and with this, the tip of the protruding portion 524 performs elliptic movement in the direction indicated by the arrow α in the figure. As a result, the driven member 51 repeatedly receives the drive force from the protruding portion 524 in one direction (direction indicated by the arrow β in the figure). With this, the first member 2 and the second member 3 relatively move in the X-axis direction.

In a case where the first member 2 and the second member 3 are intended to be relatively moved in the X-axis direction in a direction opposite to a case illustrated in FIG. 5, a drive signal obtained by inverting the drive signal described above by 180° may be used.

The detection portion 6 is an optical linear encoder. The detection portion 6 includes an optical scale 61 installed in the first member 2, a sensor 62 for detecting a movement of the optical scale 61, a substrate 63 supporting the sensor 62 with respect to the second member 3.

The optical scale 61 is installed on the installation surface 22 of the first member 2 and is fixed to the first member 2 using, for example, an adhesive or the like. The optical scale 61 is, for example, a slit plate, a polarizing plate, or the like. As illustrated in FIG. 3, the optical scale 61 extends along the X-axis direction.

Although not illustrated, the sensor 62 includes a light emitting element such as a semiconductor laser that irradiates the optical scale 61 with light and a light receiving element such as a photodiode that receives reflected light from the optical scale 61.

The substrate 63 is, for example, a wiring substrate and is fixed to the second member 3 by using screws or the like. The substrate 63 is installed on a surface of the second member 3 which is located at a side opposite to the recessed portion 31 and supports the sensor 62, and is also electrically connected to the sensor 62 and the circuit portion 7, respectively.

In the detection portion 6 as described above, a waveform of the output signal of the light receiving element of the sensor 62 is changed in accordance with a relative movement state (position, moving speed, and the like) of the second member 3 in the X-axis direction with respect to the first member 2. Accordingly, based on the output signal of the light receiving element, it is possible to detect the relative movement state of the second member 3 in the X-axis direction with respect to the first member 2.

The circuit portion 7 is installed in the recessed portion 31 of the second member 3 described above. The circuit portion 7 has a circuit for operating the piezoelectric actuator 52 and the sensor 62 described above. For example, the circuit portion 7 includes a drive circuit for driving (generating a driving signal) the piezoelectric actuator 52, a drive circuit for driving the light emitting element of the sensor 62, an arithmetic circuit for calculating the relative position of the second member 3 with respect to the first member 2, and the like based on the signal from the light receiving element of the sensor 62. A circuit (drive circuit and arithmetic circuit) for the sensor 62 included in the circuit portion 7 may be incorporated in the detection portion 6, and in this case, the circuit may be integrated with the sensor 62. The circuit portion 7 may be provided outside the piezoelectric drive device 1X.

As described above, the piezoelectric drive device 1X includes the first member 2, the second member 3 disposed above the first member 2 in the vertical direction, the piezoelectric actuator 52, the driven member 51, the optical scale 61, and a sensor 62. Here, the piezoelectric actuator 52 is disposed on one (second member 3 in the first embodiment) of the first member 2 and the second member 3 and includes the vibration portion 521 that vibrates and the protruding portion 524 that protrudes from the vibration portion 521. The driven member 51 is disposed on the other of the first member 2 and the second member 3 (first member 2 in the first embodiment) and is moved (of which position is changed) relatively to the piezoelectric actuator 52 in the X-axis direction due to contact with the protruding portion 524 accompanied by vibration of the vibration portion 521. The optical scale 61 is disposed on one of the first member 2 and the second member 3 (first member 2 in the first embodiment) and the position of the optical scale 61 is changed relatively to the piezoelectric actuator 52 accompanied by change in the relative position of the driven member 51 with respect to the piezoelectric actuator 52. The sensor 62 is disposed on the other of the first member 2 and the second member 3 (second member 3 in the first embodiment) and receives reflected light from the optical scale 61 and outputs a signal in accordance with intensity of the received light.

In particular, as illustrate in FIG. 6, the facing area S between the optical scale 61 and the sensor 62 is disposed to be deviated to one side (+Z-axis direction side) in a direction (Z-axis direction) in which the optical scale 61 and the sensor 62 are aligned, with respect to the contact portion C between the protruding portion 524 of the piezoelectric actuator 52 and the driven member 51. Here, when it is assumed that the Z-axis direction is the upper side in the vertical direction and the +Z-axis direction side is the upper side in the vertical direction, both the scale surface of the optical scale 61 (surface of the upper side in FIG. 6) and the sensor surface of the sensor 62 (surface of the lower side in FIG. 6) are positioned on the upper side in the vertical direction (+Z-axis direction side) than the contact portion C between the protruding portion 524 of the piezoelectric actuator 52 and the driven member 51.

According to such a piezoelectric drive device 1X, the facing area S between the optical scale 61 and the sensor 62 is disposed to be deviated to one side (+Z-axis direction side) in the direction (Z-axis direction) in which the optical scale 61 and the sensor 62 are aligned, with respect to the contact portion C between the protruding portion 524 and the driven member 51 and thus, it is possible to install the piezoelectric drive device 1X so that both the scale surface (upper surface in FIG. 6) of the optical scale 61 and the sensor surface (lower surface in FIG. 6) of the sensor 62 are positioned on the upper side in the vertical direction than the contact portion C between the protruding portion 524 and the driven member 51. For that reason, it is possible to reduce abrasion powder generated at the contact portion C accompanied by frictional sliding between the protruding portion 524 and the driven member 51 reaching the scale surface of the optical scale 61 and the sensor surface of the sensor 62. For that reason, it is possible to stably detect the drive state by the sensor 62.

Here, the "scale surface" refers to a surface on of the optical scale 61 of the sensor 62 side. The "sensor surface" refers to a surface which is on the optical scale 61 side of the sensor 62 and includes at least one of a light emitting surface of the light emitting element and a light receiving surface of the light receiving element included in the sensor 62.

When at least one of the scale surface of the optical scale 61 and the sensor surface of the sensor 62 is positioned on the upper side in the vertical direction than the contact portion C between the protruding portion 524 and the driven member 51, it is possible to reduce abrasion powder described above reaching at least one of the scale surface of the optical scale 61 and the sensor surface of the sensor 62.

In the first embodiment, the surface of the driven member 51 side (upper side in FIG. 6) of the protruding portion 524), that is, the surface of the driven member 51 on which the protruding portion 524 contacts and the scale surface of the optical scale 61 face the same side. That is, both the surfaces face upward (vertically upward) in FIG. 6. With this, both the driven member 51 and the optical scale 61 can be installed on the first member 2 and both the piezoelectric actuator 52 and the sensor 62 can be installed on the second member 3. For that reason, the wiring (not illustrated) connecting the piezoelectric actuator 52 and the sensor 62 to the circuit portion 7 does not straddle between the first member 2 and the second member 3 and the wiring to the piezoelectric actuator 52 and the sensor 62 can be simplified.

As such, the piezoelectric drive device 1X includes the first member 2 on which the driven member 51 and the optical scale 61 are installed and a second member 3 which supports the piezoelectric actuator 52 and the sensor 62 and is provided so that the position of the second member 3 is changeable (movable) relatively to the first member 2. With this, it is possible to dispose the driven member 51 and the optical scale 61 such that a surface on the protruding portion 524 side (upper side in FIG. 6) of the driven member 51 and the scale surface of the optical scale 61 face the same side with a relatively simple configuration.

Here, the first member 2 has the installation surface 21 which is the "first installation surface" on which the driven member 51 is installed and the installation surface 22 on which the optical scale 61 is installed and which is the "second installation surface" having a height different from that of the installation surface 21. With this, regardless of the thicknesses of the driven member 51 and the optical scale 61, it is possible to deviate the surface on the driven member 51 side of the protruding portion 524 side and the scale surface of the optical scale 61 in the height direction with a relatively simple configuration.

In particular, the first member 2 has a recessed portion 23 in which the installation surface 21 (first installation surface) configures the bottom surface. With this, it is possible to easily form the installation surface 21 (first installation surface) and the installation surface 22 (second installation surface) that have different heights. Here, the recessed portion 23 (particularly, wall surface on the right side in FIG. 6) is a first surface which intersects the installation surface 21 and the installation surface 22, at the boundary between the installation surface 21 (first installation surface) and the installation surface 22 (second installation surface). By having such a first surface in the first member 2, it is possible to enhance the effects of preventing the generated abrasion powder from scattering toward the optical scale 61.

The surface on the protruding portion 524 side of the driven member 51 side may face the side (opposite side) different from the side the scale surface of the optical scale 61 faces. In this case, for example, the sensor 62 may be attached to a member on which the driven member 51 is installed and the optical scale 61 may be attached to a member on which the piezoelectric actuator 52 is installed. In this case, the position of the optical scale 61 changes relatively to the driven member 51 accompanied by change in the relative position of the driven member 51 with respect to the vibration portion 521 changes.

Second Piezoelectric Drive Device

The piezoelectric drive device 1Y is configured similarly to the piezoelectric drive device 1X described above. However, the posture of the piezoelectric drive device 1Y in the XY plane is different from that of the piezoelectric drive device 1X by 90°. That is, the piezoelectric drive device 1Y includes the first member 2, the second member 3 disposed so as to face the first member 2, the guide mechanism 4 for guiding the second member 3 so as to be relatively moved in the Y-axis direction with respect to the first member 2, the drive portion 5 for relatively moving the second member 3 in the Y-axis direction with respect to the first member 2, the detection portion 6 (encoder) for detecting a relative movement of the second member 3 in the Y-axis direction with respect to the first member 2, and the circuit portion 7 for operating the drive portion 5 and the detection portion 6. As such, in the description of the piezoelectric drive device 1Y, the "X-axis direction" in the description of the piezoelectric drive device 1X may be appropriately replaced with the "Y-axis direction".

The second member 3 of such a piezoelectric drive device 1Y is fixed to the first member 2 of the piezoelectric drive device 1X using the screw or the like so as to have the posture aforementioned. In the piezoelectric drive device 10, the second member 3 of the piezoelectric drive device 1Y may be integrally configured with the first member 2 of the piezoelectric drive device 1X. In the following description, each of the piezoelectric drive devices 1X and 1Y is also referred to as the piezoelectric drive device 1.

The piezoelectric drive device 1Y described above has the same configuration as that of the piezoelectric drive device 1X described above and thus, achieves the same effect as that of the piezoelectric drive device 1X.

Third Piezoelectric Drive Device

Figure 7:
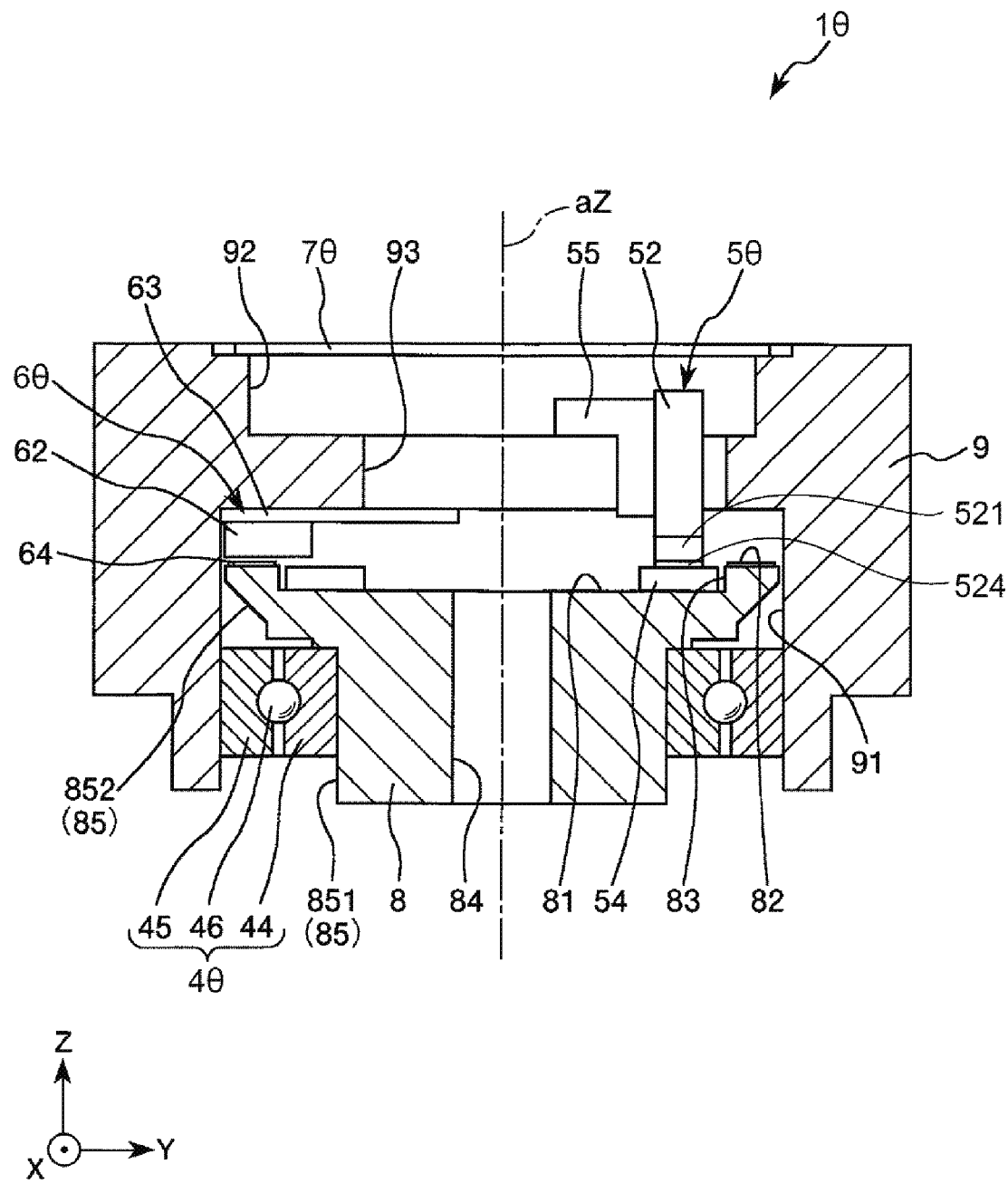
FIG. 7 is a cross-sectional view of a piezoelectric drive device for θ1 direction included in the piezoelectric drive device illustrated in FIG. 1.
Figure 8:
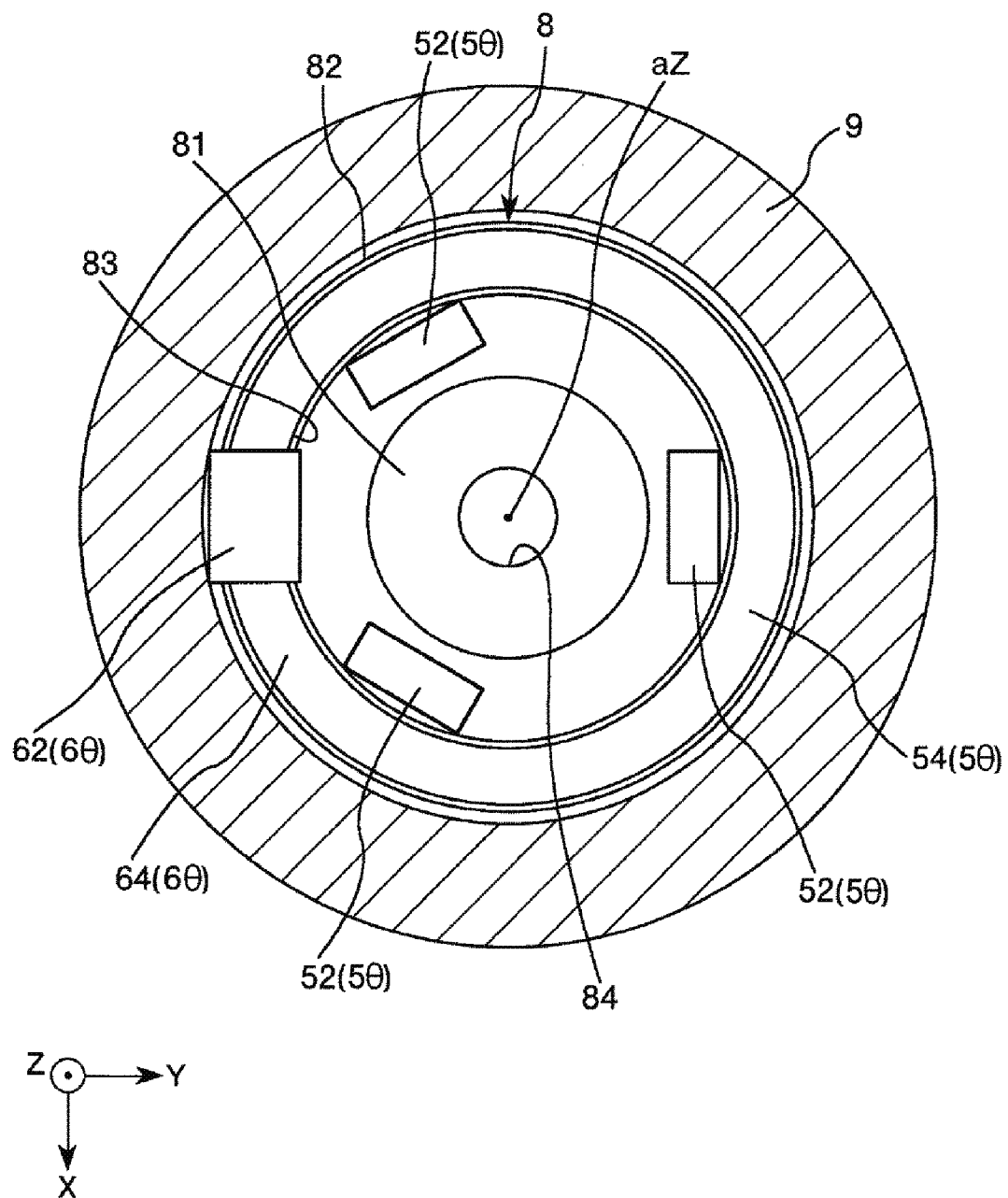
FIG. 8 is a diagram of the piezoelectric drive device illustrated in FIG. 7 when viewed from the Z-axis direction.
Figure 9:
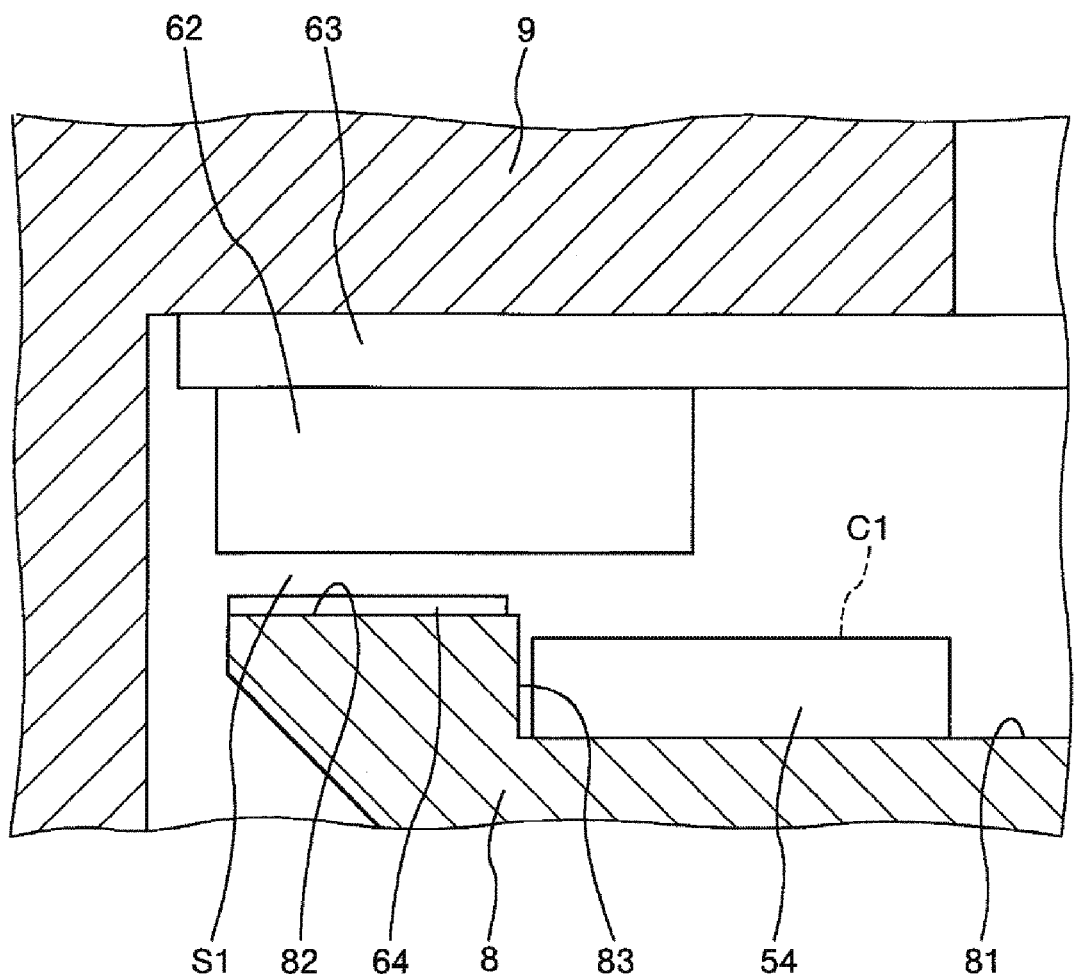
FIG. 9 is a partially enlarged cross-sectional view of the piezoelectric drive device illustrated in FIG. 7.
Figure 9:
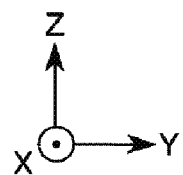

FIG. 7 is a cross-sectional view taken along the yz plane of the piezoelectric drive device for the θ1 direction included in the piezoelectric drive device illustrated in FIG. 1. FIG. 8 is a diagram of the piezoelectric drive device illustrated in FIG. 7 when viewed from the Z-axis direction. FIG. 9 is a partially enlarged cross-sectional view of the piezoelectric drive device illustrated in FIG. 7. In FIGS. 7 to 9, the same reference numerals are given to the same configurations as those of the piezoelectric drive devices 1X and 1Y described above.

As illustrated in FIG. 7, a piezoelectric drive device 1θ includes a first member 8, a second member 9, a bearing 4θ supporting the second member 9 so as to be relatively rotatable around an axis aZ parallel to the Z axis with respect to the first member 8 (direction indicated by an arrow θ1 in FIG. 1), a drive portion 5θ which relatively rotates the second member 9 around the axis aZ with respect to the first member 8, a detection portion 6θ (encoder) for detecting relative rotation about the axis aZ of the second member 9 with respect to the first member 8, and a circuit portion 7θ for operating the drive portion 5θ and the detection portion 6θ.

Each of the first member 8 and the second member 9 is made of, for example, a metal material, a ceramic material or the like. As illustrated in FIG. 8, the outer shape of the first member 8 in plan view is a rectangle (quadrangle) and the outer shape of the second member 9 in plan view is a circle, but the outer shapes thereof are not limited thereto.

Here, as illustrated in FIG. 7, a recessed portion 83 is formed on one surface (upper side in FIG. 7) of the first member 8. The bottom surface of the recessed portion 83 configures an installation surface 81 on which the driven member 54 of the drive portion 5θ described later is installed. On one surface (upper side in FIG. 7) of the first member 8, an installation surface 82 on which an optical scale 64 of a detection portion 6θ to be described later is provided is provided around the recessed portion 83.

As such, the recessed portion 83 is formed on one surface (upper side in FIG. 7) of the first member 8 and accordingly, the installation surfaces 81 and 82 having different heights are formed on one surface (upper side in FIG. 7). In the second member 9, a hole 84 that opens to the bottom surface of the recessed portion 83 and penetrates through the second member 9 in the thickness direction (Z-axis direction) around the axis aZ is formed. As illustrated in FIG. 8, the outer shapes of the recessed portion 83 and the hole 84 are circular when viewed from the Z-axis direction (hereinafter, also referred to as "plan view") and are centered on the axis aZ. Along with this, the installation surface 81 forms an annular ring centered on the axis aZ in plan view. Also, the installation surface 82 has an annular ring shape centered on the axis aZ in plan view.

As illustrated in FIG. 7, on an outer peripheral surface 85 of the first member 8, a reduced diameter portion 851 having a small width (diameter) and an enlarged diameter portion 852 having a width (diameter) larger than that of the reduced diameter portion 851 in the +Z-axis direction side with respect to the reduced diameter portion 851 are formed. The outer shape of the first member 8 in plan view is circular in the figure but is not limited thereto and may include, for example, other polygons such as a quadrilateral or pentagon, an elliptical shape, or the like. The hole 84 may be provided or omitted as necessary.

As illustrated in FIG. 7, on one surface (upper side in FIG. 7) of the second member 9, a recessed portion 91 that is open to the first member 8 side and a recessed portion 92 that is open to the side which is opposite to the first member 8, and a hole 93 which opens on both bottom surfaces of the recessed portions 91 and 92 and penetrates through the second member 9 in the thickness direction (Z-axis direction) are formed. The recessed portion 91 has a circular shape in plan view and the first member 8 described above is inserted into the recessed portion 91.

Such a second member 9 is fixed to the first member 2 of the piezoelectric drive device 1Y by using, for example, a screw or the like. In the piezoelectric drive device 1θ, the second member 9 may be integrally formed with the first member 2 of the piezoelectric drive device 1Y.

As illustrated in FIG. 7, a bearing 4θ is disposed between the first member 8 and the second member 9 described above. The bearing 4θ has an inner ring 44, an outer ring 45, and a plurality of balls 46 provided between the rings.

The inner ring 44 is fitted and fixed to the outer peripheral surface 85 (reduced diameter portion 851) of the first member 8 described above. The outer ring 45 is fitted and fixed to the inner peripheral surface of the recessed portion 91 of the second member 9 described above. The inner ring 44, the outer ring 45, and the ball 46 are configured to regulate (restrict) the relative movement of the first member 8 and the second member 9 in directions other than the rotation direction around the axis aZ. Instead of the balls 46, rollers rolling between the inner ring 44 and the outer ring 45 may be used.

A drive portion 5θ includes a driven member 54 installed in the first member 8, a plurality of (three in the figure) piezoelectric actuators 52 for transmitting a drive force to the driven member 54, a plurality of (three) support members 55 that support the plurality of piezoelectric actuators 52 with respect to the second member 3.

The driven member 54 is installed on the installation surface 81 of the first member 8 described above and is fixed to the first member 8 by using, for example, an adhesive or the like. As illustrated in FIG. 8, the driven member 54 has an annular ring shape centered on the axis aZ in plan view. Here, similar to the driven member 51 described above, the driven member 54 has a plate shape or a sheet shape and is made of a material having relatively high abrasion resistance such as a ceramic material. The shape of the driven member 54 in plan view is not limited to the illustrated shape (annular), and a portion thereof in the circumferential direction may be missing, for example, depending on a movable range of the piezoelectric drive device 1θ.

The plurality of support members 55 are provided correspondingly to the plurality of piezoelectric actuators 52 and are disposed so that the plurality of piezoelectric actuators 52 are aligned at equal angular intervals on the same circumference around the axis aZ. Each support member 55 is fixed to each of the support portion 522 and the second member 9, for example, using a screw or the like. Here, the support member 55 is made of, for example, a metal material, a ceramic material or the like, similarly to the support member 53 described above. The plurality of piezoelectric actuators 52 of the drive portion 5θ may not be aligned at equal angular intervals on the same circumference around the axis aZ and the distances from the axis aZ of the plurality of piezoelectric actuators 52 of the drive portion 5θ may be slightly different from each other.

The piezoelectric actuator 52 of the drive portion 5θ as described above operates in the same manner as the piezoelectric actuator 52 of the drive portion 5 described above to give a drive force to the driven member 54 and relatively rotate the first member 2 and the second member 3 around the axis aZ.

The detection portion 6θ includes the optical scale 64 installed in the first member 8, the sensor 62 for detecting the movement of the optical scale 64, and the substrate 63 supporting the sensor 62 with respect to the second member 9.

The optical scale 64 is installed on the installation surface 82 of the first member 8 described above and fixed to the first member 8 using, for example, an adhesive or the like. Similarly to the optical scale 61 described above, the optical scale 64 is, for example, a slit plate, a polarizing plate, or the like. However, the optical scale 64 has an annular ring shape centered on the axis aZ in plan view. The shape of the optical scale 64 in plan view is not limited to the illustrated shape (annular), and a portion thereof in the circumferential direction may be missing, for example, depending on the movable range of the piezoelectric drive device 1θ.

In the detection portion 6θ as described above, a waveform of the output signal of the light receiving element of the sensor 62 changes according to a relative rotational state (rotational position, angular velocity, or the like) of the second member 9 around the axis aZ with respect to the first member 8. Accordingly, based on the output signal of the light receiving element, it is possible to detect the relative rotational state of the second member 9 around the axis aZ with respect to the first member 8.

The circuit portion 7θ is installed in the recessed portion 92 of the second member 9 described above. Similarly to the circuit portion 7 described above, the circuit portion 7θ includes a circuit for operating the piezoelectric actuator 52 and the sensor 62. The circuit portion 7θ may be provided outside the piezoelectric drive device 1θ.

As described above, the piezoelectric drive device 1θ includes the piezoelectric actuator 52, the driven member 54, the optical scale 64, and the sensor 62. Here, the piezoelectric actuator 52 includes the vibration portion 521 that vibrates and the protruding portion 524 that protrudes from the vibration portion 521. The driven member 54 rotates relatively (of which posture changes) to the vibration portion 521 around the axis aZ due to contact with the protruding portion 524 accompanied by vibration of the vibration portion 521. The posture of the optical scale 64 changes relatively to the vibration portion 521 accompanied by a change in a relative posture of the driven member 51 with respect to the vibration portion 521. The sensor 62 receives the reflected light from the optical scale 64 and outputs a signal in accordance with the received light intensity.

In particular, as illustrated in FIG. 9, a facing area S1 between the optical scale 64 and the sensor 62 is disposed to be deviated to one side (+Z-axis direction side) in the direction (Z-axis direction) in which the optical scale 64 and the sensor 62 are aligned, with respect to a contact portion C1 between the protruding portion 524 of the piezoelectric actuator 52 and the driven member 54. Here, when it is assumed that the Z-axis direction is the vertical direction and the +Z-axis direction side is the upper side in the vertical direction, both the scale surface (surface on upper side in FIG. 9) of the optical scale 64 and the sensor surface of the sensor 62 (surface on lower side in FIG. 9) are positioned on the upper side (+Z axis direction side) in the vertical direction than the contact portion C1 between the protruding portion 524 of the piezoelectric actuator 52 and the driven member 54.

According to such a piezoelectric drive device 1θ, the facing area S1 between the optical scale 64 and the sensor 62 is disposed to be deviated to one side (+Z-axis direction side) in the direction (Z-axis direction) in which the optical scale 64 and the sensor 62 are aligned, with respect to the contact portion C1 between the protruding portion 524 and the driven member 54 and thus, it is possible to install the piezoelectric drive device 1θ so that both the scale surface (upper surface in FIG. 9) of the optical scale 64 and the sensor surface (lower surface in FIG. 9) of the sensor 62 are positioned on the upper side in the vertical direction than the contact portion C1 between the protruding portion 524 and the driven member 54. For that reason, it is possible to reduce abrasion powder generated at the contact portion C1 accompanied by frictional sliding between the protruding portion 524 and the driven member 54 reaching the scale surface of the optical scale 64 and the sensor surface of the sensor 62. For that reason, it is possible to stably detect the drive state by the sensor 62.

Here, the "scale surface" refers to a surface on the sensor 62 side of the optical scale 64. The "sensor surface" refers to a surface on the optical scale 64 side of the sensor 62 and includes at least one of a light emitting surface of the light emitting element and a light receiving surface of the light receiving element included in the sensor 62.

When at least one of the scale surface of the optical scale 64 and the sensor surface of the sensor 62 is positioned on the upper side in the vertical direction than the contact portion C1 between the protruding portion 524 and the driven member 54, it is possible to reduce abrasion powder reaching at least one of the scale surface of the optical scale 64 and the sensor surface of the sensor 62.

In the first embodiment, the surface of the driven member 54 on the protruding portion 524 side (upper side in FIG. 9) and the scale surface of the optical scale 64 face the same side. That is, both of these faces face upward (vertically upward) in FIG. 9. With this, it is possible to install both the driven member 54 and the optical scale 64 in the first member 8, and install both the piezoelectric actuator 52 and the sensor 62 in the second member 9. For that reason, the wiring (not illustrated) connecting the piezoelectric actuator 52 and the sensor 62 to the circuit portion 7θ does not straddle between the first member 8 and the second member 9 and the wiring to the piezoelectric actuator 52 and the sensor 62 can be simplified.

As such, the piezoelectric drive device 1θ includes the first member 8 on which the driven member 54 and the optical scale 64 are installed and second member 9 which supports the piezoelectric actuator 52 and the sensor 62 and of which the posture can be changed (rotatable) relatively to the first member 8. With this, it is possible to dispose the driven member 54 and the optical scale 64 so that the surface of the driven member 54 on the protruding portion 524 side (upper side in FIG. 9) and the scale surface of the optical scale 64 face the same side with a relatively simple configuration.

Here, the first member 8 has the installation surface 81 which is the "first installation surface" on which the driven member 54 is installed and the installation surface 82 which is the "second installation surface", on which the optical scale 64 is installed, and of which the height is different from that of the installation surface 81. With this, regardless of the thicknesses of the driven member 54 and the optical scale 64, it is possible to deviate the surface on the protruding portion 524 side of the driven member 54 and the scale surface of the optical scale 64 in the height direction with a relatively simple configuration.

In particular, the first member 8 has a recessed portion 83 in which the installation surface 81 (first installation surface) configures the bottom surface. Accordingly, it is possible to easily form the installation surface 81 (first installation surface) and the installation surface 82 (second installation surface) having different heights.

In the piezoelectric drive device 1θ as described above, the relative rotation angle range of the first member 8 and the second member 9 around the axis line aZ may be limited to a predetermined angle of 360° or less, or may be 360° or more. In a case where the relative rotation angle range is 360° or more, that is, a case where the first member 8 and the second member 9 are relatively rotatable around the axis aZ, it may be said that the piezoelectric drive device 1θ is a piezoelectric motor having a piezoelectric drive device 1θ. According to such a piezoelectric motor, the piezoelectric drive device 1θ stably can detect the drive state and perform highly accurate drive. For that reason, drive characteristics of the piezoelectric motor can be improved.

Second Embodiment

Figure 10:
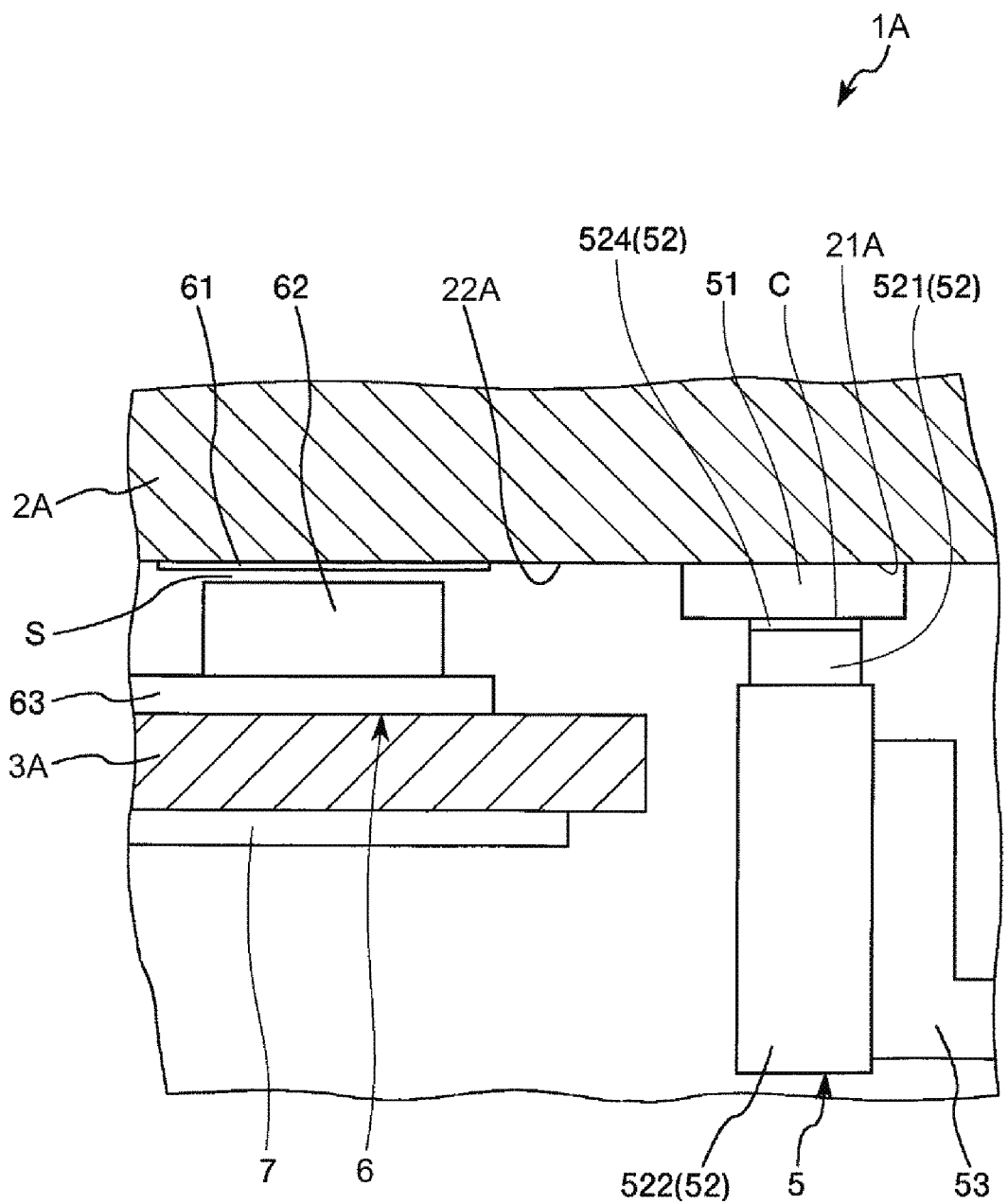
FIG. 10 is a partially enlarged cross-sectional view of a piezoelectric drive device according to a second embodiment of the invention.

FIG. 10 is a partially enlarged cross-sectional view of a piezoelectric drive device according to a second embodiment of the invention. In the following description, the second embodiment will be mainly described on differences from the embodiment described above and description of similar matters will be omitted. In FIG. 10, the same reference numerals are given to the same configurations as those of the embodiment described above.

A piezoelectric drive device 1A illustrated in FIG. 10 includes a first member 2A on which the driven member 51 and the optical scale 61 are installed and a second member 3A on which the piezoelectric actuator 52, the support member 53, the sensor 62, and the substrate 63 are installed. Here, in the piezoelectric drive device 1A, the directions of the drive portion 5 and the detection portion 6 are opposite to each other in the up-and-down direction as compared with the first embodiment described above.

On one surface (lower side in FIG. 10) of the first member 2A, an installation surface 21A on which the driven member 51 of the drive portion 5 is installed and an installation surface 22A on which the optical scale 61 of the detection portion 6 is installed are provided. The installation surfaces 21A and 22A are provided on the same plane.

Here, the thickness of the driven member 51 is thicker than the thickness of the optical scale 61. For that reason, the facing area S between the optical scale 61 and the sensor 62 is disposed to be deviated to one side (−Z-axis direction side) in a direction (Z-axis direction) in which the optical scale 61 and the sensor 62 are aligned, with respect to the contact portion C between the protruding portion 524 of the piezoelectric actuator 52 and the driven member 51. That is, both the scale surface of the optical scale 61 (surface of the lower side in FIG. 10) and the sensor surface of the sensor 62 (surface of the upper side in FIG. 10) are positioned on the upper side (+Z-axis direction side) in the vertical direction than the contact portion C between the protruding portion 524 of the piezoelectric actuator 52 and the driven member 51.

Even with piezoelectric drive device 1A described above, it is possible to stably detect the drive state. In the second embodiment, although a case where the installation surfaces 21A and 22A are provided on the same plane has been described as an example, the heights may be different. For example, the recessed portion may be formed in the first member 2A and the bottom surface of the recessed portion may be set as the installation surface 22A for installing the optical scale 61.

2. Robot

Next, an embodiment of a robot according to the invention will be described.

Figure 11:
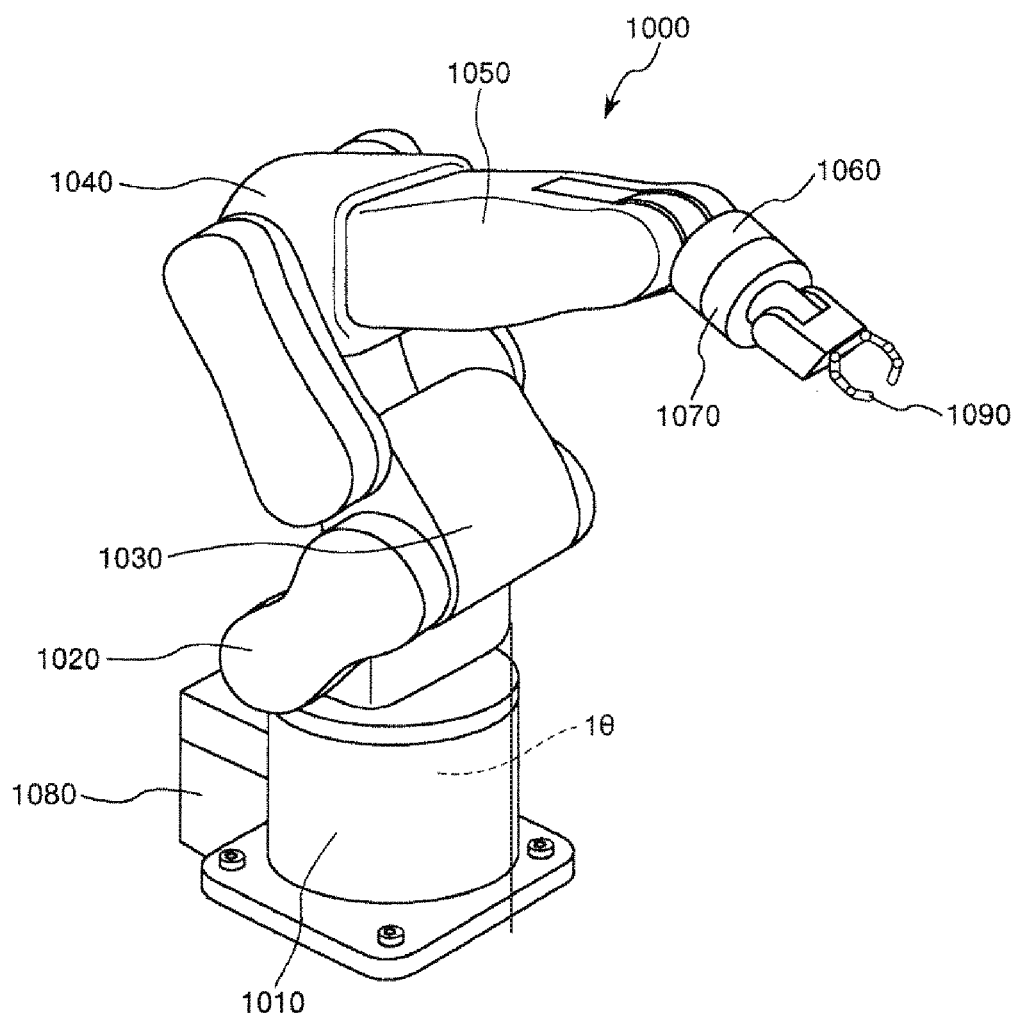
FIG. 11 is a perspective view illustrating an embodiment of a robot according to the invention.

FIG. 11 is a perspective view illustrating an embodiment of a robot according to the invention.

A robot 1000 illustrated in FIG. 11 can perform work such as feeding of material, removing of material, transporting of material, and assembling of material for precision equipment and parts (object) constituting the precision equipment. The robot 1000 is a six-shaft robot, and includes abase 1010 fixed to a floor or a ceiling, an arm 1020 rotatably connected to the base 1010, an arm 1030 rotatably connected to the arm 1020, an arm 1040 rotatably connected to the arm 1030, an arm 1050 rotatably connected to the arm 1040, an arm 1060 rotatably connected to the arm 1050, an arm 1070 rotatably connected to the arm 1060, and a robot control unit 1080 for controlling driving of the arms 1020, 1030, 1040, 1050, 1060, and 1070. A hand connection portion is provided on the arm 1070, and an end effector 1090 according to the work to be executed by the robot 1000 is mounted on the hand connection portion. The piezoelectric drive device 1θ is mounted as a piezoelectric motor on all or a portion of each joint portion and the piezoelectric drive device 1θ is disposed so that the scale surface of the optical scale and the sensor surface of the sensor are positioned on the upper side in the vertical direction than the contact portion between the protruding portion and the driven member in a state where the arm is stopped. The arms 1020, 1030, 1040, 1050, 1060, and 1070 are rotated by driving of the piezoelectric drive device 1θ. Driving of each piezoelectric drive device 1θ is controlled by the robot control unit 1080.

The robot 1000 as described above includes the piezoelectric drive device 1θ. According to such a robot 1000, the piezoelectric drive device 1θ can stably detect the drive state and perform highly accurate drive. For that reason, it is possible to improve characteristics of the robot 1000 by using drive characteristics of such a piezoelectric drive device 1θ.

3. Electronic Component Transport Apparatus

Next, an embodiment of an electronic component transport apparatus according to the invention will be described.

Figure 12:
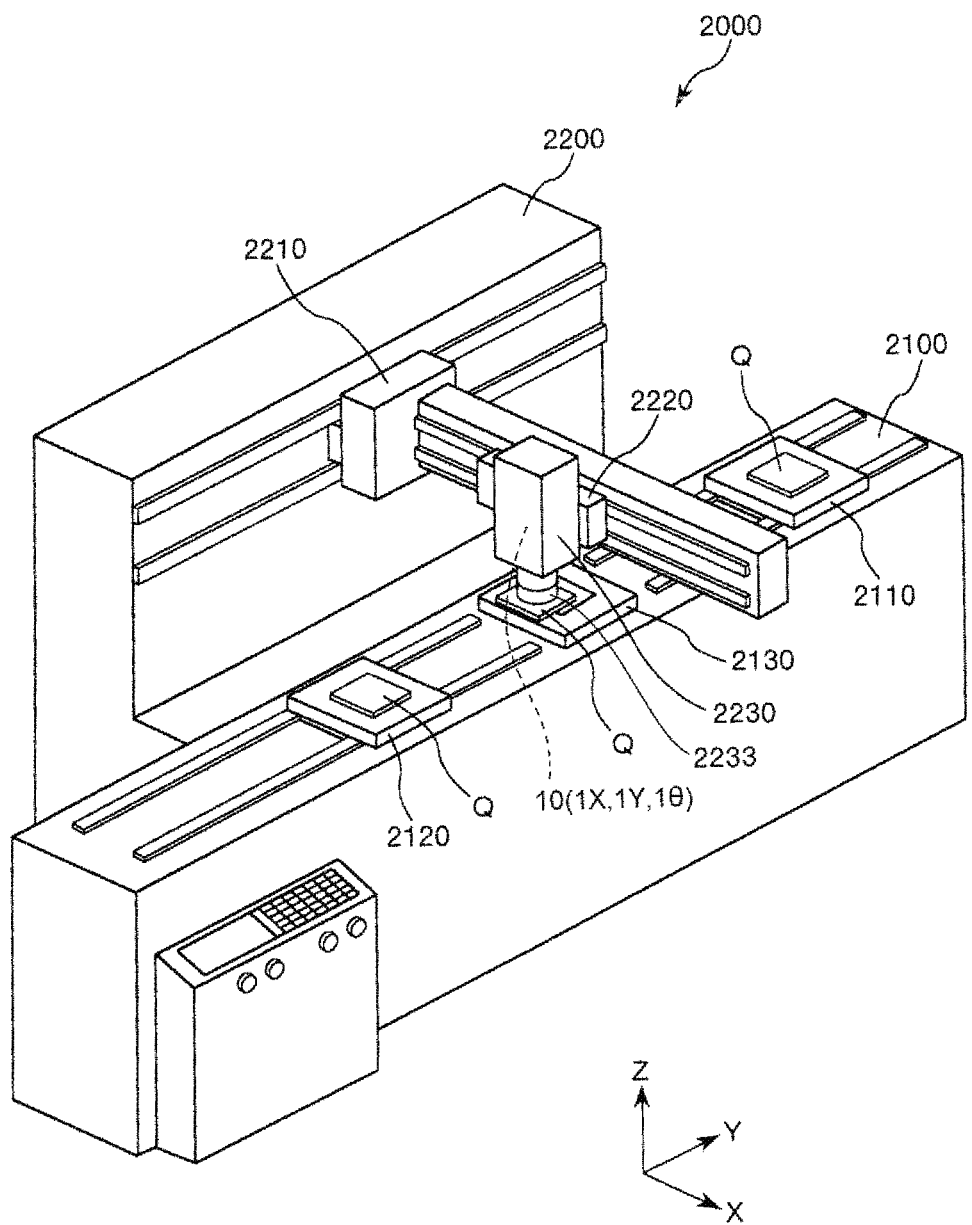
FIG. 12 is a perspective view illustrating an embodiment of an electronic component transport apparatus according to the invention.

FIG. 12 is a perspective view illustrating an embodiment of the electronic component transport apparatus according to the invention.

An electronic component transport apparatus 2000 illustrated in FIG. 12 is applied to an electronic component inspection apparatus, and includes a base 2100 and a support stand 2200 disposed on a side of the base 2100. Further, on the base 2100, an upstream stage 2110 on which an electronic component Q to be inspected is mounted and transported in the Y-axis direction and a downstream stage 2120 on which an inspected electronic component Q is mounted and transported in the Y-axis direction, and an inspection table 2130 which is positioned between the downstream stage 2120 and the upstream stage 2110 and on which electrical characteristics of the electronic component Q is inspected are provided. Examples of the electronic component Q include a semiconductor, a semiconductor wafer, a display device such as a CLD and an OLED, a quartz crystal device, various sensors, an ink jet head, various MEMS devices, and the like.

A Y-stage 2210 movable in the Y-axis direction with respect to the support stand 2200 is provided on the support stand 2200, an X-stage 2220 movable in the X-axis direction with respect to the Y-stage 2210 provided on the Y-stage 2210, and an electronic component holding portion 2230 movable in the Z-axis direction with respect to the X-stage 2220 is provided on the X-stage 2220.

The electronic component holding portion 2230 includes the piezoelectric drive device 10 and a holding portion 2233 for holding the electronic component Q. Here, the piezoelectric drive device 10 is used as a positioning unit that performs fine positioning. The second member 3 of the piezoelectric drive device 1X included in the piezoelectric drive device 10 is fixed to the X-stage 2220. The holding portion 2233 is fixed to the first member 8 of the piezoelectric drive device 1θ included in the piezoelectric drive device 10. Here, the piezoelectric drive device 1θ is disposed so that the scale surface of the optical scale and the sensor surface of the sensor are positioned on the upper side in the vertical direction than the contact portion between the protruding portion and the driven member (in the direction in which the protruding portion and the driven member are positioned).

The electronic component transport apparatus 2000 as described above includes the piezoelectric drive device 10 (1X, 1Y, and 1θ). According to such an electronic component transport apparatus 2000, the piezoelectric drive device 10 can stably detect the drive state and perform highly accurate drive. For that reason, it is possible to improve characteristics of the electronic component transport apparatus 2000 by using the drive characteristics of the piezoelectric drive device 10 as described above.

4. Printer

Figure 13:
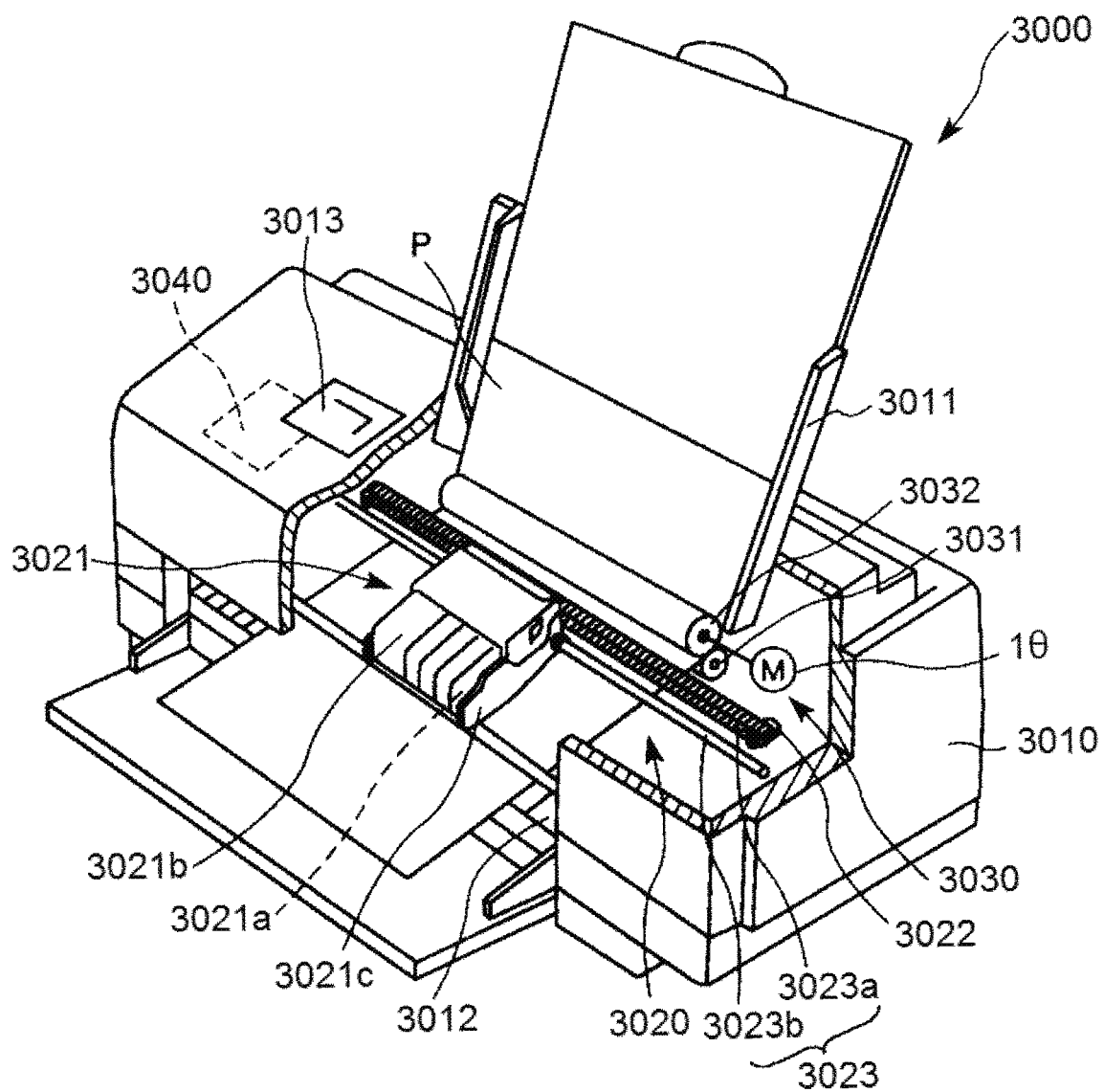
FIG. 13 is a perspective view illustrating an embodiment of a printer according to the invention.

FIG. 13 is a perspective view illustrating an embodiment of a printer according to the invention.

A printer 3000 illustrated in FIG. 13 is an ink jet recording type printer. The printer 3000 illustrated in FIG. 13 includes an apparatus main body 3010, a printing mechanism 3020 provided inside the apparatus main body 3010, a sheet feed mechanism 3030, and a control unit 3040.

The apparatus main body 3010 is provided with a tray 3011 for placing a recording sheet P, a sheet discharge port 3012 for discharging the recording sheet P, and an operation panel 3013 such as a liquid crystal display.

The printing mechanism 3020 includes a head unit 3021, a carriage motor 3022, and a reciprocating mechanism 3023 for reciprocating the head unit 3021 by a drive force of the carriage motor 3022. The head unit 3021 includes a head 3021a which is an ink jet type recording head, an ink cartridge 3021b which supplies ink to the head 3021a, and a carriage 3021c on which the head 3021a and the ink cartridge 3021b are mounted. The reciprocating mechanism 3023a includes a carriage guide shaft 3023a which reciprocatably supports the carriage 3021c and a timing belt 3023b for moving the carriage 3021c on the carriage guide shaft 3023a by the drive force of the carriage motor 3022.

The sheet feed mechanism 3030 includes a driven roller 3031 and a driving roller 3032 that are in pressure contact with each other and a piezoelectric drive device 1θ (piezoelectric motor) that is a sheet feeding motor that drives the driving roller 3032. The piezoelectric drive device 1θ is disposed so that the scale surface of the optical scale and the sensor surface of the sensor are positioned on the upper side in the vertical direction than the contact portion between the protruding portion and the driven member (in the direction in which the protruding portion and the driven member are positioned).

The control unit 3040 controls the printing mechanism 3020, the sheet feed mechanism 3030, and the like based on print data input from a host computer such as a personal computer.

In such a printer 3000, the sheet feed mechanism 3030 intermittently feeds the recording paper P one by one to the vicinity of the lower portion of the head unit 3021. At this time, the head unit 3021 reciprocates in a direction substantially orthogonal to the feeding direction of the recording paper P and printing on the recording paper P is performed.

The printer 3000 as described above includes the piezoelectric drive device 1θ. According to such a printer 3000, the piezoelectric drive device 1θ can stably detect the drive state and perform highly accurate drive. For that reason, it is possible to improve characteristics of the printer 3000 by using the drive characteristics of the piezoelectric drive device 1θ as described above.

Although the piezoelectric drive device, the piezoelectric motor, the robot, the electronic component transport apparatus, and the printer according to the invention have been described based on the illustrated embodiments, the invention is not limited thereto and the configuration of each of the portions and units can be remounted with an arbitrary configuration having the same function. Further, any other component may be added to the invention. Embodiments described above may be appropriately combined.

In the embodiments described above, although the configurations in which the piezoelectric drive device is applied to the robot, the electronic component transport apparatus, and the printer are described, the piezoelectric drive device can also be applied to various electronic devices other than those described above. In addition, when the piezoelectric drive device is used for a printer, the piezoelectric drive device is not limited to a driving source of a paper feeding roller of a printer, but can also be applied to, for example, a driving source of an ink jet head of a printer or the like.

In the embodiment described above, a case where the invention is applied to a reflection type optical encoder has been described as an example, but the invention can also be applied to a transmission type optical encoder. In this case, the light emitting element and the light receiving element included in the sensor are disposed so as to sandwich the optical scale. The sensor receives transmitted light from the optical scale and outputs a signal in accordance with intensity of the received light.

The entire disclosure of Japanese Patent Application No. 2017-069768, filed Mar. 31, 2017 is expressly incorporated by reference herein.

What is claimed is:

1. A piezoelectric drive device comprising:
a first member;
a second member disposed above the first member in a vertical direction;
a piezoelectric actuator which is disposed on one of the first member and the second member and includes a vibration portion that vibrates and a protruding portion that protrudes from the vibration portion;
a driven member which is disposed on the other of the first member and the second member and of which a position or posture changes relatively to the piezoelectric actuator due to contact with the protruding portion accompanied by vibration of the vibration portion;
an optical scale which is disposed on one of the first member and the second member and of which a position or posture changes relatively to the piezoelectric actuator or the driven member, accompanied by the relative change of the position or posture of the driven member with respect to the piezoelectric actuator; and a sensor which is disposed on the other of the first member and the second member, receives transmitted light or reflected light from the optical scale, and outputs a signal in accordance with intensity of the received light, wherein a scale surface of the optical scale and a sensor surface of the sensor is positioned on an upper side in the vertical direction above a contact portion between the protruding portion and the driven member.

2. A piezoelectric drive device comprising:

a piezoelectric actuator which includes a vibration portion that vibrates and a protruding portion that protrudes from the vibration portion;

a driven member of which a position or posture changes relatively to the piezoelectric actuator due to contact with the protruding portion accompanied by vibration of the vibration portion;

an optical scale of which a position or posture changes relatively to the piezoelectric actuator or the driven member, accompanied by the relative change of the position or posture of the driven member with respect to the piezoelectric actuator; and a sensor which receives transmitted light or reflected light from the optical scale and outputs a signal in accordance with intensity of the received light, wherein a facing area of the optical scale and the sensor is disposed to be deviated to one side in a direction in which the optical scale and the sensor are aligned with respect to a contact portion between the protruding portion and the driven member.

3. The piezoelectric drive device according to claim 1, wherein a surface of the driven member with which the protruding portion contacts and the scale surface of the optical scale face the same side.

4. The piezoelectric drive device according to claim 2, further comprising:

a first member on which the driven member and the optical scale are installed; and a second member which supports the piezoelectric actuator and the sensor and is provided so as to be changeable in a position or posture relatively to the first member.

5. The piezoelectric drive device according to claim 4, wherein the first member includes a first installation surface on which the driven member is installed and a second installation surface on which the optical scale is installed and having a height different from that of the first installation surface.

6. The piezoelectric drive device according to claim 5, wherein the first member includes a first surface intersecting the first installation surface and the second installation surface, at a boundary between the first installation surface and the second installation surface.

7. The piezoelectric drive device according to claim 5, wherein the first member has a recessed portion in which the first installation surface constitutes a bottom surface.

8. A piezoelectric motor comprising:
the piezoelectric drive device according to claim 1.

9. A piezoelectric motor comprising:
the piezoelectric drive device according to claim 2.

10. A piezoelectric motor comprising:
the piezoelectric drive device according to claim 3.

11. A piezoelectric motor comprising:
the piezoelectric drive device according to claim 4.

12. A robot comprising:
the piezoelectric drive device according to claim 1.

13. A robot comprising:
the piezoelectric drive device according to claim 2.

14. A robot comprising:
the piezoelectric drive device according to claim 3.

15. An electronic component transport apparatus comprising:
the piezoelectric drive device according to claim 1.

16. An electronic component transport apparatus comprising:
the piezoelectric drive device according to claim 2.

17. An electronic component transport apparatus comprising:
the piezoelectric drive device according to claim 3.

18. A printer comprising:
the piezoelectric drive device according to claim 1.

19. A printer comprising:
the piezoelectric drive device according to claim 2.

20. A printer comprising:
the piezoelectric drive device according to claim 3.

* * * * *